Patented Mar. 11, 1941

2,234,724

UNITED STATES PATENT OFFICE 2,234,724

AZO COMPOUNDS AND MATERIAL COLORED THEREWITH

Joseph B. Dickey, Rochester, N. Y., assignor to Eastman Kodak Company, Rochester, N. Y., a corporation of New Jersey No Drawing. Application October 18, 1939,
Serial No. 300,028

10 Claims. (Cl. 260—155)

This invention relates to azo compounds and to fibrous cellulose acetate colored therewith. More particularly it relates to non-sulfonated nuclear azo compounds having the following general formulae:

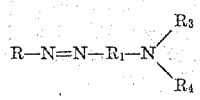

and

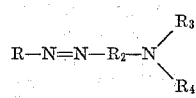

wherein each R represents a benzene nucleus, $R_1$ represents a quinoline nucleus attached to the azo group through a nuclear carbon atom in position 5, the said quinoline nucleus having the group

attached to a nuclear carbon atom in position 8, $R_2$ represents a quinoline nucleus attached to the azo group through a nuclear carbon atom in position 8, the said quinoline nucleus having the group

attached to a nuclear carbon atom in position 5, and wherein each $R_3$ represents a member selected from the group consisting of a hydroxyalkyl group, a sulfoalkyl group, a sulfatoalkyl group, a phosphoalkyl group, and a phosphatoalkyl group, and each $R_4$ represents a member selected from the group consisting of hydrogen, an alkyl group, an alkylene group, a phenyl group, and a member selected from the group $R_3$. Furthermore, the nuclei represented by R, $R_1$, and $R_2$ may be substituted by one or more monovalent substituents selected from the group consisting of a hydroxyl group, a halogen represented by chlorine, bromine, and fluorine; an alkyl group represented by methyl, ethyl, butyl and the like groups; an alkoxy group represented by methoxy, and ethoxy groups; a phenoxy group; and a nitrogen group represented by an amino group, an alkylamino group such as methylamino, ethylamino, hydroxyethylamino, and an acylamino group represented by acetamino, propamino, butamino, and similar kind of groups. The members represented by $R_3$ are intended to include more specifically groups such as hydroxyethyl, $\beta$-hydroxypropyl, $\gamma$-hydroxypropyl, $\beta,\gamma$-dihydroxypropyl, $\omega$-hydroxybutyl, sulfoethyl, sulfopropyl, sulfatoethyl, sulfatobutyl, phosphoethyl, phosphobutyl, phosphatoethyl, phosphatopropyl and similar kind of groups. In the case of $R_4$, the members are intended to include among others such groups as methyl, ethyl, cetyl, allyl, crotonyl, phenyl, and phenyl groups substituted by one or more substituents selected from the group consisting of chlorine, bromine, methyl, ethyl, methoxy, ethoxy, and nitro groups.

While the azo compounds of my invention are primarily concerned with the monoazo compounds, it will be understood that the polyazo compounds are likewise included within the scope of the invention. R in the above formula, for example, may be an azobenzene nucleus or a substituted azobenzene nucleus.

It is an object of my invention, therefore, to prepare the class of azo compounds above described and to color fibrous cellulose organic derivatives of cellulose, particularly cellulose acetate fibers, threads, yarns, and fabric materials therewith.

The azo compounds of the invention may be prepared by coupling the diazo salts of the preferred aminobenzenes with 5-amino- and 8-aminoquinolines having the general formulae:

and

wherein $R_1$, $R_2$, and each $R_3$ and $R_4$ have the meanings previously defined.

The intermediates represented by the above general formulae may be obtained from quinoline or substituted quinolines having no substituents in the 5 and 8 positions by nitration under suitably controlled conditions to the 5-nitro- and 8-nitro quinolines, reducing these compounds to the corresponding amines, and then alkylating or arylating by standard methods to the coupling intermediates desired. The hydroxyalkylamino derivatives, which are capable of being sulfated, phosphated, phosphited and the like, may be prepared from the desired aminoquinolines by condensation with a chlorohydrin or an alkylene oxide.

The invention is illustrated by the following examples which disclose the preparation of some of the azo compounds of my invention.

*Example I*

1 mole of p-aminoacetophenone is dissolved in 2000 ccs. of water containing 250 ccs. of hydrochloric acid, ice added, and the amine diazotized with 69 grams of sodium nitrite. 1 mole of 8-di-β-hydroxyethylaminoquinoline is dissolved in 2000 ccs. of water containing 250 ccs. of hydrochloric acid, ice added, and the diazo solution added with stirring. The mixture is then slowly neutralized with sodium acetate using Congo red indicating paper. When the coupling reaction is complete, the dye is filtered off, washed and dried. Cellulose acetate is colored yellow shades from an aqueous suspension of the dye.

The azo compound thus obtained has the formula:

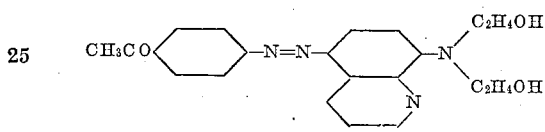

*Example 2*

The diazo solution of Example I is added with stirring to 1 mole of butyl sodium-β-sulfatoethyl-5-aminoquinoline dissolved in a minimum of water containing ice.

Concurrently with the addition of the diazo solution there is added a solution of sodium bicarbonate in sufficient quantity to keep the mixture free of mineral acid. When the coupling reaction is complete, the dye is salted out, filtered and dried. Cellulose acetate is colored yellow shades from an aqueous solution of the dye.

The azo compound obtained has the formula:

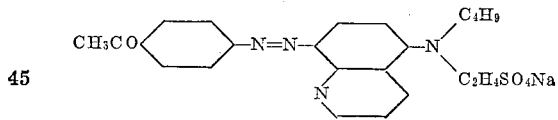

*Example 3*

1 mole of p-nitroaniline is dissolved in a minimum amount of sulfuric acid, poured onto ice, and diazotized with 69 grams of sodium nitrite. This solution is then added to 1 mole of propyl-β-di-sodium phosphoethyl-5-amino-6-methoxyquinoline dissolved in a minimum of water, ice added, and coupling and isolation of the dye effected as described in Example 2. Cellulose acetate is colored red shades from an aqueous solution of the dye.

The azo compound obtained has the formula:

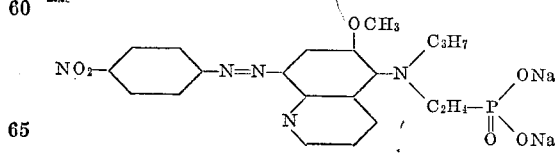

*Example 4*

(A) 76 grams of sodium nitrite are dissolved in 530 ccs. of concentrated sulphuric acid by heating the mixture to not over 70° C., and then cooling to 10–15° C.

(B) 1 mole of 2,4-dinitro-6-bromoaniline is dissolved in 2300 ccs. of hot glacial acetic acid and cooled as rapidly as possible to room temperature.

The diazotization is accomplished by adding solution (B) to (A), with stirring, over a 30 minute period, maintaining meanwhile a temperature of 10–15° C., followed thereafter by stirring for another 30 minutes, and the final addition of 10 grams of urea to remove any free nitrous acid. This solution is then coupled by the procedure of Example I with 1 mole of 8-diglycerylamino-7-chloroquinoline dissolved in 2500 ccs. of water containing 200 ccs. of hydrochloric acid. Sufficient sodium carbonate is added to give the mono- or di-sodium salt. Cellulose acetate is colored violet shades from an aqueous suspension of the dye.

The azo compound thus obtained has the formula:

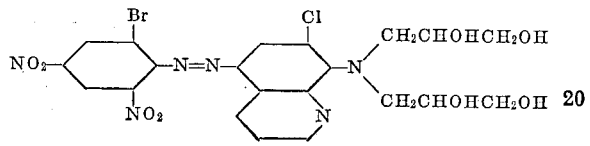

*Example 5*

1 mole of 3,5-dinitroanthranilic acid or its methyl ester are diazotized and coupled with 1 mole of butyl sodium-γ-propylsulfonate-8-aminoquinoline following the procedure described in Example 4. Cellulose acetate is colored violet shades from an aqueous suspension of the dye.

The azo compound obtained has the formula:

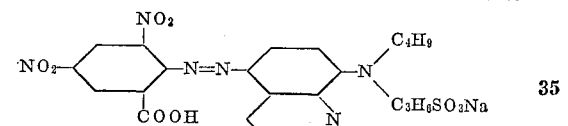

*Example 6*

1 mole of 4-nitro-2-hydroxyaniline is diazotized and added to a cold dilute hydrochloric acid solution of 8-glycerylamino-6-methylquinoline. The coupling reaction is completed by adding sodium acetate, after which the dye is filtered off, washed and dried. Cellulose acetate is colored pinkish-red shades from an aqueous suspension of the dye.

The azo compound obtained has the formula:

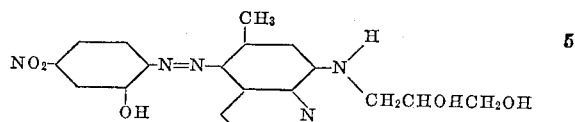

*Example 7*

1 mole of 2,4-dinitro-6-ethylsulfonamide aniline is diazotized and added to an acetic acid solution of 5-ethylglycerylamino-7-acetaminoquinoline. The coupling reaction is completed with sodium acetate, water added, and the precipitated dye is filtered off, washed and dried. Cellulose acetate is colored blue shades from an aqueous suspension of the dye.

The azo compound has the formula:

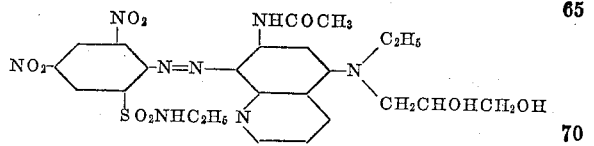

The scope of my invention will be more fully evident by reference to the following table, wherein are disclosed additional examples of various suitable diazotization and coupling components, the dyes resulting therefrom coloring cellulose acetate fibers the shades of color designated.

| Diazotization component | Coupling component | Shade on cellulose acetate |
|---|---|---|
| p-Aminoacetophenone | (1) 5-di-β-hydroxyethylamino quinoline | Orange to red. |
| Do | (2) 5-glycerylamino-7-methylquinoline | Do. |
| Do | (3) 8-butyl-β-sodium sulfoethylamino-7-methoxyquinoline | Do. |
| Do | (4) 8-β-hydroxypropylamino-6-hydroxyquinoline | Do. |
| Do | (5) 5-N-phenyl-β-sulfatoethylamino-2-methylquinoline | Do. |
| Do | (6) 5-N-allyl-γ-phosphato-propylamino quinoline | Do. |
| Do | (7) 8-cyclohexyl-β-hydroxy-β-ethoxyethyl-7-chloroquinoline | Do. |
| Do | (8) 8-ethylglycerylamino-6-acetaminoquinoline | Do. |
| p-Nitroaniline | Couplers 1-8 | Orange-red to rubine. |
| p-Nitro-o-chloroaniline | ___do___ | Red to wine. |
| p-Nitro-o-hydroxyaniline | ___do___ | Pink-red to pink-rubine. |
| p-Nitro-o-carboxyamidoaniline | ___do___ | Red to rubine. |
| p-Aminoazobenzene | ___do___ | Orange to red. |
| 2,4-dinitroaniline | ___do___ | Rubine to red-blue. |
| 2,4-dinitro-6-chloroaniline | ___do___ | Rubine to blue. |
| 2,4,6-trinitroaniline | ___do___ | Do. |

In the application of the azo compounds of my invention to the coloration of organic derivatives of cellulose, the dye compound may be formed on the fiber by diazotizing the desired amine and coupling with the developer in situ, or the dye compound may first be prepared in the manner described and then applied to the material to be colored from an aqueous solution or suspension of the dye. Since most of the azo compounds of the invention are water-soluble, they can ordinarily be applied directly from an aqueous solution containing salt without the necessity of employing a dispersing or solubilizing agent. For a more detailed description as to how the water-soluble members of my dye compounds may be employed for the coloring of fibrous materials, reference may be had to the general methods described in McNally and Dickey U. S. Patent No. 2,107,898, issued February 8, 1938. Where the particular dye compound is only slightly or moderately soluble in water, it is first ground to a paste with a dispersing agent such as a soap, a sulfonated oil, or a higher fatty acid glyceryl sulfate, and the resulting paste then dispersed in water. The material to be colored is immersed in this dispersion starting with a bath temperature of approximately 45–55° C., and then gradually increasing the temperature to 80–85° C., at which point it is maintained for several hours. Sodium chloride may be added to facilitate exhaustion of the dye bath during the dyeing operation. When the material has acquired the desired shade, it is removed from the bath, washed with soap, rinsed and dried.

While my invention is illustrated more particularly in connection with cellulose acetate, a material to which the invention is especially adapted, it will be understood that the azo dye compounds above described are not limited exclusively to cellulose acetate, but are likewise applicable for coloring organic derivatives of cellulose in general, including both the hydrolyzed as well as the unhydrolyzed organic acid esters of cellulose such as cellulose formate, cellulose acetate, cellulose propionate, cellulose butyrate, and the hydrolyzed as well as the unhydrolyzed mixed organic acid esters of cellulose such as cellulose acetate-propionate, cellulose acetate-butyrate, and cellulose ethers such as methyl cellulose, ethyl cellulose, and benzyl cellulose.

I claim:
1. The non-sulfonated nuclear azo compounds selected from the group consisting of azo compounds having the general formulae:

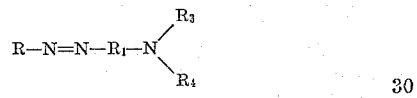

and

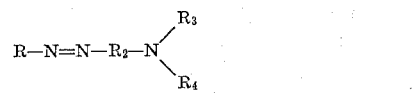

wherein each R represents a benzene nucleus, $R_1$ represents a quinoline nucleus attached to the azo group through a nuclear carbon atom in position 5, the said quinoline nucleus having the group

attached to a nuclear carbon atom in position 8, $R_2$ represents a quinoline nucleus attached to the azo group through a nuclear carbon atom in position 8, the said quinoline nucleus having the group

attached to a nuclear carbon atom in position 5, and wherein each $R_3$ represents a member selected from the group consisting of a hydroxyalkyl group, a sulfoalkyl group, a sulfatoalkyl group, a phosphoalkyl group, and a phosphatoalkyl group, and each $R_4$ represents a member selected from the group consisting of hydrogen, an alkyl group, an alkylene group, a phenyl group, and a member selected from the group $R_3$.

2. The non-sulfonated nuclear azo compounds having the general formula:

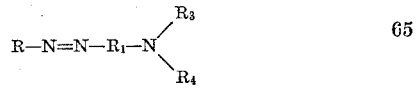

wherein R represents a benzene nucleus, $R_1$ represents a quinoline nucleus attached to the azo group through a nuclear carbon atom in position 5, the said quinoline nucleus having the group

attached to a nuclear carbon atom in position 8, and wherein R3 represents a member selected from the group consisting of a hydroxylalkyl group, a sulfoalkyl group, a sulfatoalkyl group, a phosphoalkyl group, and a phosphatoalkyl group, and R4 represents a member selected from the group consisting of hydrogen, an alkyl group, an alkylene group, a phenyl group, and a member selected from the group R3.

3. The non-sulfonated nuclear azo compounds having the general formula:

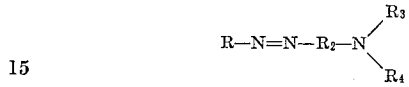

wherein R represents a benzene nucleus, R2 represents a quinoline nucleus attached to the azo group through a nuclear carbon atom in position 8, the said quinoline nucleus having the group

added to a nuclear carbon atom in position 5, and wherein R3 represents a member selected from the group consisting of a hydroxyalkyl group, a sulfoalkyl group, a sulfatoalkyl group, a phosphoalkyl group, and a phosphatoalkyl group, and R4 represents a member selected from the group consisting of hydrogen, an alkyl group, an alkylene group, a phenyl group, and a member selected from the group R3.

4. The non-sulfonated nuclear azo compounds selected from the group consisting of azo compounds having the general formulae:

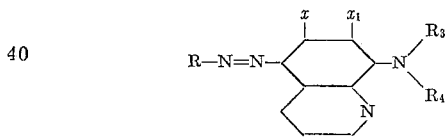

and

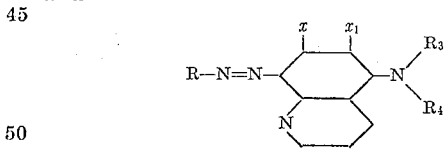

wherein each R represents a benzene nucleus, each $x$ and $x_1$ represent a member selected from the group consisting of hydrogen, a halogen, an alkyl group, an alkoxy group, an amino group, an acylamino group, and a hydroxyl group, R3 represents a member selected from the group consisting of a hydroxyalkyl group, a sulfoalkyl group, a sulfatoalkyl group, a phosphoalkyl group, and a phosphatoalkyl group, and R4 represents a member selected from the group consisting of hydrogen, an alkyl group, an alkylene group, a phenyl group, and a member selected from the group R3.

5. The non-sulfonated nuclear azo compounds having the general formula:

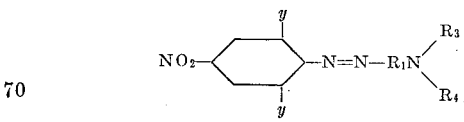

wherein each $y$ represents a member selected from the group consisting of hydrogen, a halogen, and a nitro group, R1 represents a quinoline nucleus attached to the azo group through a nuclear carbon atom in position 5, the said quinoline nucleus having the group

attached to a nuclear carbon atom in position 8, and wherein R3 represents a member selected from the group consisting of a hydroxyalkyl group, a sulfoalkyl group, a sulfatoalkyl group, a phosphoalkyl group, and a phosphatoalkyl group, and R4 represents a member selected from the group consisting of hydrogen, an alkyl group, an alkylene group, a phenyl group, and a member selected from the group R3.

6. The non-sulfonated nuclear azo compounds having the general formula:

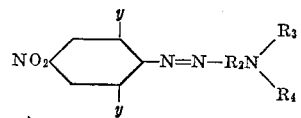

wherein each $y$ represents a member selected from the group consisting of hydrogen, a halogen, and a nitro group, R2 represents a quinoline nucleus attached to the azo group through a nuclear carbon atom in position 8, the said quinoline nucleus having the group

attached to a nuclear carbon atom in position 5, and wherein R3 represents a member selected from the group consisting of a hydroxyalkyl group, a sulfoalkyl group, a sulfatoalkyl group, a phosphoalkyl group, and a phosphatoalkyl group, and R4 represents a member selected from the group consisting of hydrogen, an alkyl group, an alkylene group, a phenyl group, and a member selected from the group R3.

7. Material made of or containing an organic derivative of cellulose colored with a dye selected from the group consisting of non-sulfonated nuclear azo compounds having the general formulae:

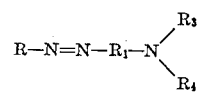

and

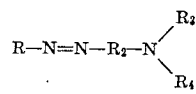

wherein each R represents a benzene nucleus, R1 represents a quinoline nucleus attached to the azo group through a nuclear carbon atom in position 5, the said quinoline nucleus having the group

attached to a nuclear carbon atom in position 8, R2 represents a quinoline nucleus attached to the azo group through a nuclear carbon atom in position 8, the said quinoline nucleus having the group

attached to a nuclear carbon atom in position 5, and wherein each $R_3$ represents a member selected from the group consisting of a hydroxyalkyl group, a sulfoalkyl group, a sulfatoalkyl group, a phosphoalkyl group, and a phosphatoalkyl group, and each $R_4$ represents a member selected from the group consisting of hydrogen, an alkyl group, an alkylene group, a phenyl group, and a member selected from the group $R_3$.

8. Material made of or containing cellulose acetate colored with a dye selected from the group consisting of non-sulfonated azo compounds having the general formulae:

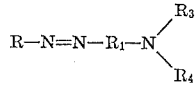

and

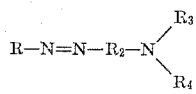

wherein each R represents a benzene nucleus, $R_1$ represents a quinoline nucleus attached to the azo group through a nuclear carbon atom in position 5, the said quinoline nucleus having the group

attached to a nuclear carbon atom in position 8, $R_2$ represents a quinoline nucleus attached to the azo group through a nuclear carbon atom in position 8, the said quinoline nucleus having the group

attached to a nuclear carbon atom in position 5, and wherein each $R_3$ represents a member selected from the group consisting of a hydroxyalkyl group, a sulfoalkyl group, a sulfatoalkyl group, a phosphoalkyl group, and a phosphatoalkyl group, and each $R_4$ represents a member selected from the group consisting of hydrogen, an alkyl group, an alkylene group, a phenyl group, and a member selected from the group $R_3$.

9. Material made of or containing cellulose acetate colored with a dye selected from the group of non-sulfonated nuclear azo compounds having the general formula:

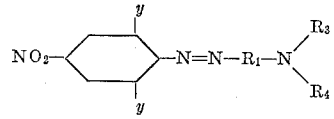

wherein each $y$ represents a member selected from the group consisting of hydrogen, a halogen, and a nitro group, $R_1$ represents a quinoline nucleus attached to the azo group through a nuclear carbon atom in position 5, the said quinoline nucleus having the group

attached to a nuclear carbon atom in position 8, and wherein $R_3$ represents a member selected from the group consisting of a hydroxyalkyl group, a sulfoalkyl group, a sulfatoalkyl group, a phosphoalkyl group, and a phosphatoalkyl group, and $R_4$ represents a member selected from the group consisting of hydrogen, an alkyl group, an alkylene group, a phenyl group, and a member selected from the group $R_3$.

10. Material made of or containing cellulose acetate colored with a dye selected from the group of non-sulfonated nuclear azo compounds having the general formula:

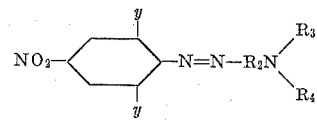

wherein $y$ represents a member selected from the group consisting of hydrogen, a halogen, and a nitro group, $R_2$ represents a quinoline nucleus attached to the azo group through a nuclear carbon atom in position 8, the said quinoline nucleus having the group

attached to a nuclear carbon atom in position 5, and wherein $R_3$ represents a member selected from the group consisting of a hydroxyalkyl group, a sulfoalkyl group, a sulfatoalkyl group, a phosphoalkyl group, and a phosphatoalkyl group, and $R_4$ represents a member selected from the group consisting of hydrogen, an alkyl group, an alkylene group, a phenyl group, and a member selected from the group $R_3$.

JOSEPH B. DICKEY.